June 4, 1957  E. B. FRYKMAN  2,794,462
POWER OPERATED SCREW-HOLDING SCREW DRIVERS
Filed Nov. 25, 1955

INVENTOR
E. B. FRYKMAN
BY C. A. Hamilton
ATTORNEY

# United States Patent Office 2,794,462
Patented June 4, 1957

2,794,462
POWER OPERATED SCREW-HOLDING SCREW DRIVERS

Eugene B. Frykman, Duluth, Minn., assignor to Western Electric Company, Incorporated, New York, N. Y., a corporation of New York Application November 25, 1955, Serial No. 548,981

5 Claims. (Cl. 144—32)

This invention relates to screw drivers and more particularly to screw drivers having magnetic means for picking up and holding screws to be driven.

An object of this invention is to provide a simplified screw driver having a magnetized portion for picking up and holding ferromagnetic screws to be driven.

Another object of this invention is to provide a simplified screw driver having a screw-engaging and driving element which can be quickly replaced when worn or damaged.

One embodiment of the present invention may include a rotatable shank housing a magnetized insert and having a recess for receiving a head of a screw of ferromagnetic material. A blade mounted in a transverse slot in the shank passes through a slot in the head of the screw whereby the screw is rotated with the rotation of the shank. The screw is picked up and held in driving position by the magnetized insert housed in the shank.

Other objects and advantages of the invention will become apparent by reference to the following detailed description and the accompanying drawing illustrating a preferred embodiment of the invention, in which Fig. 1 is an elevational view of the device mounted in a power driven screw driver showing a screw held in position to be driven into an article;

Figure 1:
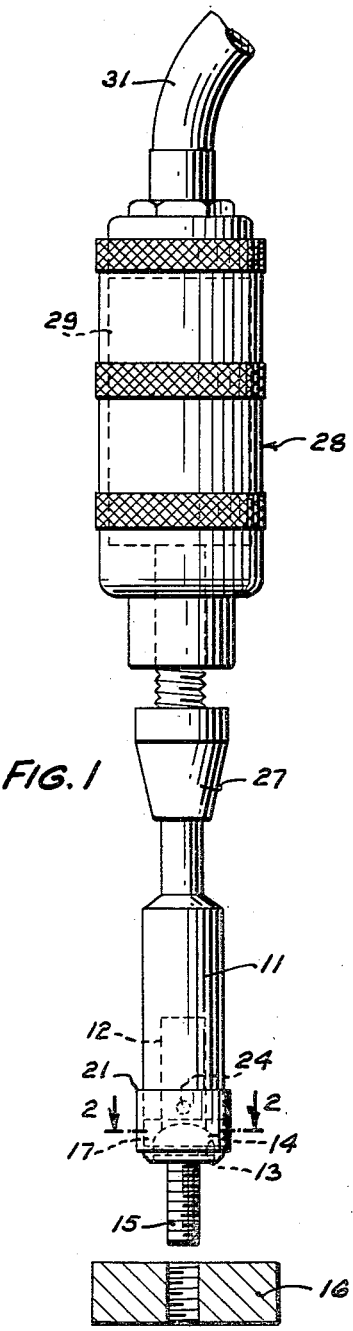
Figure 2:
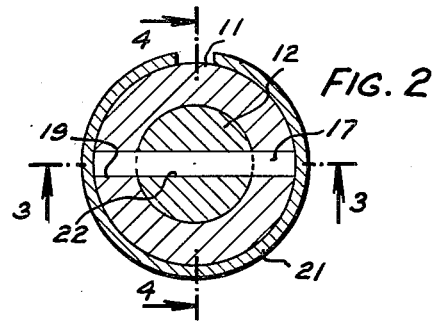
Fig. 2 is an enlarged cross-sectional view taken on line 2—2 of Fig. 1 showing the driving blade mounted in the transverse slot in the shank.
Figure 3:
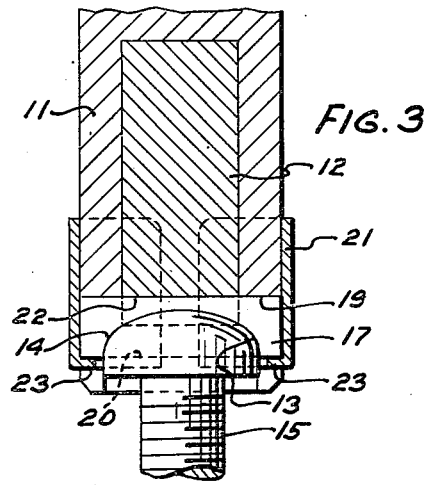
Fig. 3 is a cross-sectional view taken along line 3—3 of Fig. 2 showing the lugs on the resilient sleeve holding the driving blade in the transverse slot in the shank.
Figure 4:
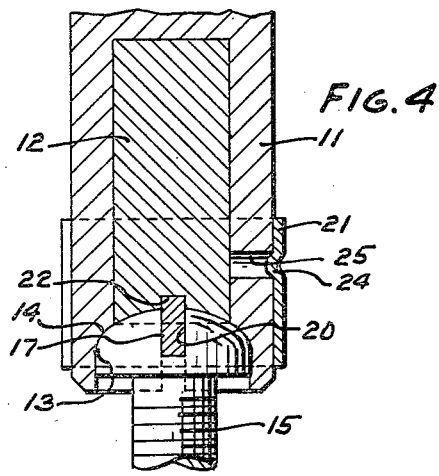
Fig. 4 is a cross-sectional view taken on line 4—4 of Fig. 2 showing the driving blade passing through the slot in the screw head.

Referring now in detail to the drawing, a partially hollow steel shank 11 is shown housing a magnetized insert 12 and having a socket 13 in its lower end for receiving a head 14 of a ferromagnetic screw 15 to be driven into an article 16 (Fig. 1). A driving blade 17 mounted partially in a transverse slot 19 in the lower end of the shank 11 and partially in a slot 22 in the lower end of the magnetized insert 12 extends across the socket 13 in the shank 11, whereby, when the screw head 14 is inserted into the recess 13 in the shank 11, the central portion of the blade 17 enters a slot 20 in the screw head 14. The magnetized insert 12, which is retained in the hollow shank 11 by the blade 17, holds the screw head 14 in this driving position.

A split, resilient, sleeve 21 mounted on the lower end of the shank 11 is provided with a pair of lugs 23, which extend radially inward into the transverse slot 19 in the shank 11 beneath the driving blade 17 to hold it in the slot 19. An embossed portion 24 of the sleeve 21 enters an aperture 25 in the shank 11 to retain the sleeve 21 in proper position on the shank. The sleeve 21 can be quickly removed from the shank 11 to release the driving blade 17 and the magnetized insert 12 to facilitate repair or replacement of the driving blade 17 if it becomes damaged during operation. Also, the magnetized insert 12 can be quickly replaced if such replacement is desirable, since the insert 12 drops out of the shank 11 with the driving blade 17 when the resilient sleeve 21 is removed from the shank, the blade normally holding the magnetized insert 12 in place in the shank.

The upper end of the shank 11 is secured in a chuck 27 of a power driven screw driver 28 of a well-known, compressed air-driven, type. The chuck 27 and the shank 11 are rotated by a compressed air motor 29 mounted in the screw driver 28 and driven by compressed air delivered through a hose 31.

Operation

In operation, the screw head 14 of the ferro-magnetic screw 15 is inserted into the socket 13 in the shank 11 where it is held by the magnetized insert 12 with the driving blade 17 passing through the slot 20 in the screw head 14. The screw driver 28 is then manually moved to locate the screw 15 in position to be driven into the article 16, as illustrated in Fig. 1. The screw driver 28 is then actuated by the admission of compressed air through the hose 31 to drive the motor 29 which rotates the chuck 27 and the shank 11. Rotation of the shank 11 rotates the screw 15 to drive it into the article 16, since the driving blade 17, which is mounted in the transverse slot 19 in the shank 11 and rotated therewith, is also held in the slot 20 in the head 14 of the screw 15.

The resilient sleeve 21 can be quickly removed from the shank 11 to permit the driving blade 17 and the insert 12 to drop out of the shank 11, thus permitting a rapid replacement of the blade 17 on the insert 12 when such replacement is desirable.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A tool for driving threaded fastening elements comprising a rotatable member having a socket for receiving the head of a fastening element to be driven, said head being provided with a conventional kerf, a magnetized element mounted in the rotatable member for magnetically holding the head of the fastening element in said socket, a driving element mounted in the socket for engaging the kerf in the head of the fastening element to rotate it with said member, and a latching member mounted removably on the rotatable member and having portions projecting into the socket in said rotatable member to engage the driving element to retain it in the socket.

2. A tool for driving threaded fastening elements comprising a shank having a socket for receiving the slotted head of a fastening element to be driven, said shank also having a transverse slot intersecting the socket, a magnet carried by the shank for holding the head of the fastening element in the socket, means for rotating the shank, a driving blade mounted in the transverse slot in the shank for entering the slot in the head of the fastening element to rotate it with the shank, a resilient sleeve mounted on the shank and having portions extending into the transverse slot in the shank for engaging the driving element to retain it in said slot.

3. A screw driver comprising a shank having an axial recess and a transverse slot at one end thereof, means for rotating the shank, a magnetized element mounted in the axial recess in the shank for magnetically holding the slotted head of a fastening element to be driven, a driving blade mounted in the transverse slot in the shank for interlocking with the slotted head of the screw, and a quick-detachable member mounted on the shank for retaining the magnetized element and the driving blade in position in the shank.

4. A screw driver comprising a shank having an aperture and a socket for receiving the slotted head of a screw to be driven, a magnetized element carried by the shank at the bottom of the socket for holding the head of the screw in said socket, means for rotating the shank, said shank also having a transverse slot in its lower end, a driving blade mounted in said transverse slot and extending through the socket in the shank for entering the slot in the head of the screw when it is inserted into said socket, a resilient sleeve member mounted on the shank and having lugs extending radially inward into said transverse slot to engage the driving pin and retain it therein, said sleeve also having a portion extending into the aperture in the shank to retain the sleeve on the shank.

5. A screw driver comprising a shank having an aperture and a socket for receiving the slotted head of a screw to be driven, a magnetized element carried by the shank at the bottom of the socket for holding the head of the screw in said socket, said magnetized element having a transverse slot in its lower end, means for rotating the shank, said shank also having a transverse slot intersecting the socket in alignment with the slot in the magnetized element, a driving blade mounted in the aligned slots in the shank and the magnetized element for entering the slot in the head of the screw when it is inserted into the socket in the shank, said blade retaining the magnetized element in the socket in the shank, a quick-detachable sleeve mounted on the shank and having lugs extending radially inward into the transverse slot in the shank beneath the driving blade to retain it and the magnetized element in proper position, said sleeve also having a portion extending into the aperture in the shank to retain the sleeve on said shank.

References Cited in the file of this patent

UNITED STATES PATENTS

| | | |
|---|---|---|
| 1,587,647 | Hood et al. | June 8, 1926 |
| 2,260,055 | Reardon | Oct. 21, 1941 |
| 2,300,308 | Ojalvo | Oct. 27, 1942 |
| 2,671,484 | Clark | Mar. 9, 1954 |
| 2,677,294 | Clark | May 4, 1954 |
| 2,688,991 | Doyle | Sept. 14, 1954 |